United States Patent
Udezue et al.

(10) Patent No.: US 8,028,335 B2
(45) Date of Patent: Sep. 27, 2011

(54) PROTECTED ENVIRONMENTS FOR PROTECTING USERS AGAINST UNDESIRABLE ACTIVITIES

(75) Inventors: Ojiakonobi Udezue, Redmond, WA (US); Bryan T Starbuck, Redmond, WA (US); Daniel S Struthers, Federal Way, WA (US); Geurt B De Raad, Sammamish, WA (US); Anthony G Thane, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 11/424,971

(22) Filed: Jun. 19, 2006

(65) Prior Publication Data

US 2007/0294763 A1    Dec. 20, 2007

(51) Int. Cl.
*G06F 11/00* (2006.01)
*G06F 12/14* (2006.01)
*G06F 12/16* (2006.01)
*G08B 23/00* (2006.01)

(52) U.S. Cl. ........................................................ 726/22
(58) Field of Classification Search .................. None
See application file for complete search history.

(56) References Cited

U.S. PATENT DOCUMENTS

| | | | |
|---|---|---|---|
| 7,117,370 B2 * | 10/2006 | Khan et al. ................... | 713/186 |
| 2003/0097409 A1 * | 5/2003 | Tsai ............................. | 709/206 |
| 2004/0064515 A1 | 4/2004 | Hockey | |
| 2004/0199596 A1 | 10/2004 | Nutkis | |
| 2005/0108340 A1 | 5/2005 | Gleeson et al. | |
| 2005/0120019 A1 | 6/2005 | Rigoutsos et al. | |
| 2005/0132069 A1 | 6/2005 | Shannon et al. | |
| 2005/0204005 A1 * | 9/2005 | Purcell et al. ................. | 709/206 |
| 2005/0257261 A1 * | 11/2005 | Shraim et al. ................. | 726/22 |

(Continued)

FOREIGN PATENT DOCUMENTS

WO    WO2005027016    3/2005

OTHER PUBLICATIONS

"Get anti-phishing and spam filters with Outlook SP2", Available at http://www.microsoft.com/athome/security/email/outlook_sp2_filters.mspx.

(Continued)

*Primary Examiner* — Nasser Moazzami
*Assistant Examiner* — Trong Nguyen
(74) *Attorney, Agent, or Firm* — Lee & Hayes, PLLC

(57) ABSTRACT

Various embodiments protect against undesirable activities, in at least some embodiments, by combining the protection of a data or message filter with the user's own knowledge and judgment. In at least some embodiments, data or a message that is suspected of being associated with an undesirable activity is identified and indicia is provided to a user that the message is suspect. The data or message is presented to the user in a protected environment that allows the user to access the data or message in full fidelity, but prevents them from interacting with the data or message in a manner which would expose them to the undesirable activity. After reviewing the data or message in the protected environment, the user can decide how the message should thereafter be treated.

16 Claims, 5 Drawing Sheets

U.S. PATENT DOCUMENTS

| | | | |
|---|---|---|---|
| 2005/0289148 A1* | 12/2005 | Dorner et al. | 707/10 |
| 2006/0031333 A1 | 2/2006 | O'Neil | |
| 2006/0047760 A1 | 3/2006 | Encinas et al. | |
| 2006/0053202 A1 | 3/2006 | Foo et al. | |
| 2006/0053293 A1 | 3/2006 | Zager et al. | |
| 2006/0059111 A1 | 3/2006 | Tucker et al. | |
| 2006/0080735 A1* | 4/2006 | Brinson et al. | 726/22 |
| 2006/0200523 A1* | 9/2006 | Tokuda et al. | 709/206 |
| 2007/0130327 A1* | 6/2007 | Kuo et al. | 709/224 |

OTHER PUBLICATIONS

"Microsoft's new Anti-Phishing Toolbar for Internet Explorer" Available at http://www.infopackets.com/channels/en/windows/gazette/2005/20050826__microsofts__new__anti__phishing__toolbar__for__internet__explorer.htm.

"Qurb 3.0 Anti-Phishing, Antispam and E-mail Search Software for Microsoft Outlook and Microsoft Outlook Express" Available at http://www.qurb.com/company/qurb-3.0-user-guide.pdf.

* cited by examiner

PROTECTED ENVIRONMENTS FOR PROTECTING USERS AGAINST UNDESIRABLE ACTIVITIES

BACKGROUND

Many threats have emerged in the arena of online communications. Often, these threats involve web resources that can be associated with undesirable activities that can somehow impact a user and/or the user's computing device. Undesirable activities can come in many shapes and sizes. For example, phishing, where scammers or other bad actors attempt to gain illegal or unauthorized access to private information, is one example of such a threat. Other types of threats exist as well.

Online communication can allow these scammers to reach many people easily through the use of such things as e-mail, instant messaging, and rogue web pages. Often, a user can be misled into navigating to a fraudulent link that the user believes is trustworthy. As a consequence, the user may be subjected to attempts to elicit their private information. For example, a user may receive an electronic mail (email) message asking them to navigate to what appears to be a legitimate website, but which is actually a fraudulent website. Once there, the user may be prompted to divulge personal information such as credit card numbers, social security numbers and the like. This message, at least at a first cursory glance, might appear to be legitimate to the user. For instance, the sender's name and/or links associated with the message might contain an expression that the user deems trustworthy, such as "Amazon.com". However, once the user has navigated to the fraudulent website and divulged their personal information, they have been "phished".

Many existing email applications rely exclusively on filters to protect users from phishing attacks. Utilizing one or more filters, messages that are suspected of being associated with an undesirable activity, like phishing, are identified and typically deleted. Consequently, the user is simply prevented from accessing and scrutinizing these messages. Unfortunately, if the filtering software incorrectly identifies a phishing attack, then the user can completely miss the message.

SUMMARY

A user is protected against undesirable activities, in at least some embodiments, by combining the protection of a data or message filter with the user's own knowledge and judgment. In at least some embodiments, data or a message that is suspected of being associated with an undesirable activity is identified and indicia is provided to the user that the message is suspect. The data or message is presented to the user in a protected environment that allows the user to access the data or message in full fidelity, but prevents them from interacting with the data or message in a manner which would expose them to the undesirable activity. After reviewing the data or message in the protected environment, the user can decide how the message should thereafter be treated. For instance, the user may decide to remove the protected environment and interact more directly with the data or message. Alternatively, the user may decide to delete the data or message.

DETAILED DESCRIPTION

Overview

Various embodiments protect against undesirable activities by combining the protection of a data or message filter with the user's own knowledge and judgment. In at least some embodiments, data or a message that is suspected of being associated with an undesirable activity is identified and indicia is provided to the user that the message is suspect. The data or message is presented to the user in a protected environment that allows the user to access the data or message in fill fidelity, but prevents them from interacting with the data or message in a manner which would expose them to the undesirable activity. After reviewing the data or message in the protected environment, the user can decide how the message should thereafter be treated. For instance, the user may decide to remove the protected environment and interact more directly with the data or message. Alternatively, the user may decide to delete the data or message.

Exemplary Embodiments

Figure 1:
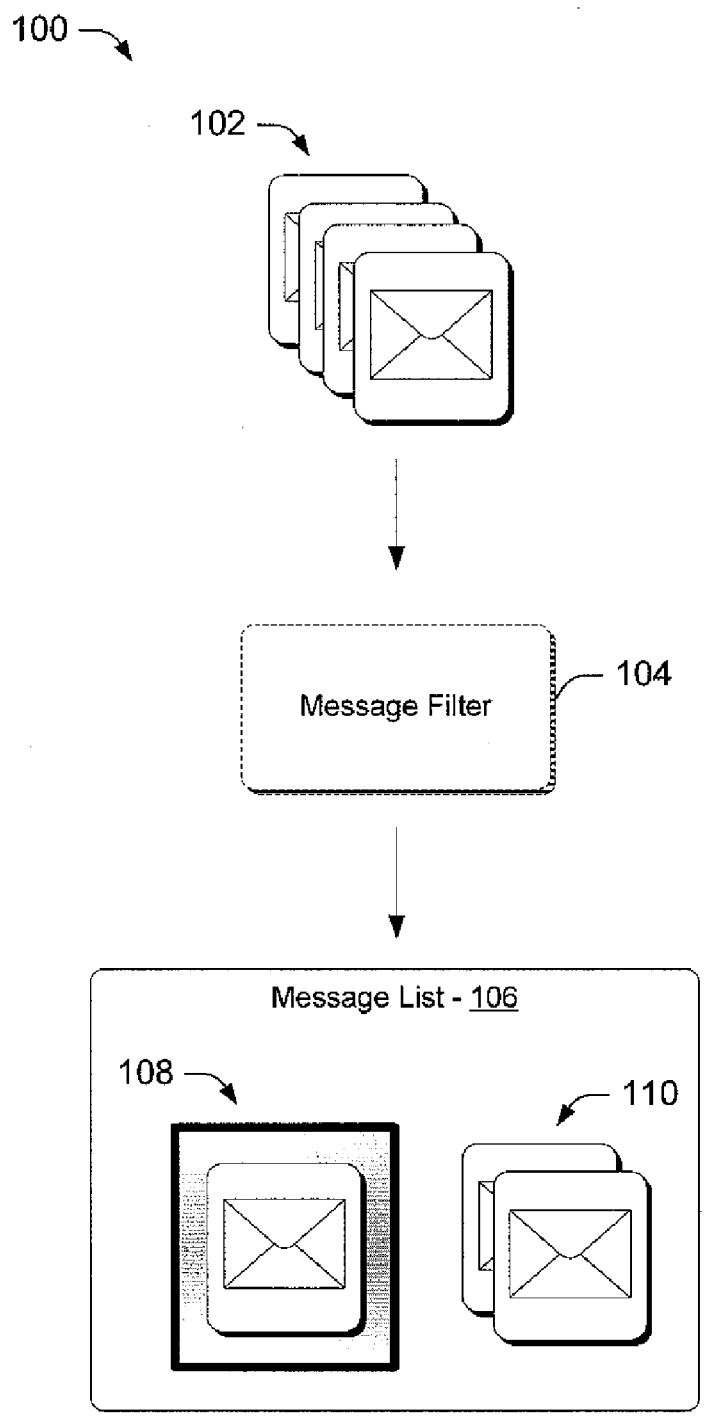
FIG. 1 illustrates a high level view of a protected environment in accordance with one embodiment.

FIG. 1 illustrates one embodiment in which the principles and methods described below can be implemented, generally at 100. These principles and methods can be used to protect a user against undesirable activities by combining the protection of a message filter with the user's own knowledge and judgment. By way of example and not limitation, undesirable activities can include phishing, spamming, and email messages containing viruses.

System 100 includes data which, in this example, takes the form of one or more messages 102 each of which is analyzed by utilizing one or more message filters, here depicted as message filter 104.

Messages that are suspected of being associated with an undesirable activity can be identified as suspicious and then made available to the user, albeit in a protected environment. Any suitable data or message filters can be utilized to analyze the data or messages. For example, undesirable activities might be identified by looking at the source of the data or message. If the source is one that has been associated with undesirable activities in the past, then the message may be suspect. Alternately or additionally, the actual content of the data message may suggest that it is associated with undesirable activities. Alternately or additionally, there may be some pattern associated with the data or message that suggests an undesirable activity (e.g. a large number of recipients and the like).

Here, the received messages are shown as part of a message list 106. Messages identified as being suspicious can be presented to the user in a protected environment. Here message 108 is depicted as being presented in such an environment, as illustrated by the enclosed, shaded rectangle. However, note that message 108 is still presented to the user in full fidelity, despite being encased in the protected environment which, in this example, is a visually distinctive, transparent protective window. That is, the transparency of the protective window allows the user to view and read the data or message while, at the same time, it prevents them from directly interacting with the content of the data or message in a manner that would potentially expose them to the undesirable activity (e.g. as by preventing them from clicking a link or entering information).

In contrast, messages that are not identified as suspicious are simply presented to the user without the protected environment, here depicted as messages 110. The user is free to interact with these messages in the usual way.

Figure 2:
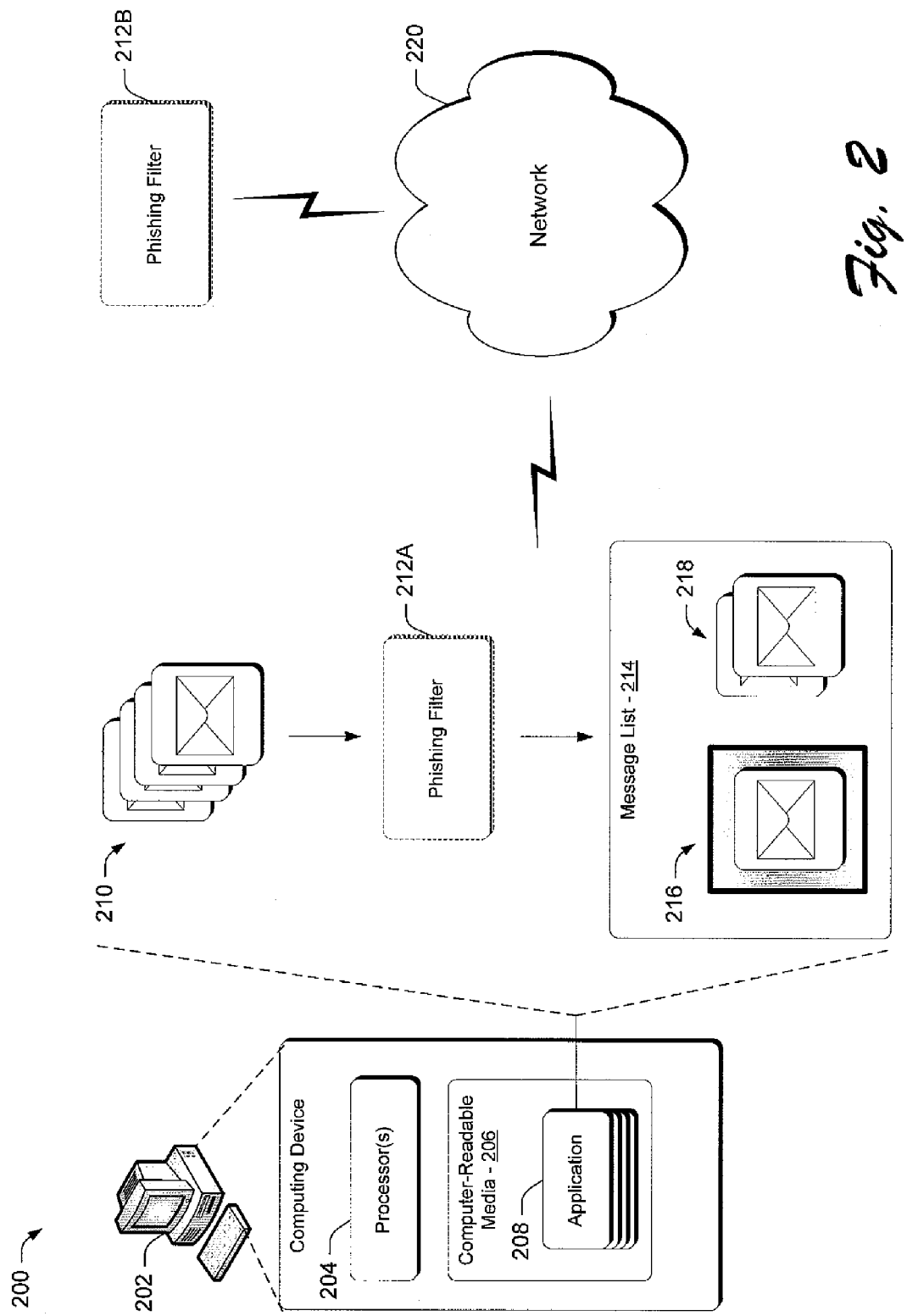
FIG. 2 illustrates an exemplary system in accordance with one embodiment.

FIG. 2 illustrates an exemplary system in which the principles and methods described above and below can be implemented in accordance with one embodiment, generally at 200. System 200 includes, in this example, one or more computing devices 202 each of which includes one or more processors 204, one or more computer-readable media 206, wherein such computer-readable media 206 are magnetic disks, semiconductor devices and/or hardware devices upon which data can be written for storage and retrieval, and one or more applications 208 that reside on the computer-readable media and which are executable by the processor(s).

Although computing device 202 is illustrated in the form of a desktop computer, it is to be appreciated and understood that other computing devices can be utilized without departing from the spirit and scope of the claimed subject matter. Other computing devices can include, by way of example and not limitation, portable computers, handheld computers such as personal digital assistants (PDAs), cell phones and the like. For example, a user of a cell phone, PDA, or other mobile device may receive messages through that device. Utilizing the principles described above and below, the user can be protected against undesirable activities.

System 200 also includes or otherwise makes use of a message filter which, in this example, is a phishing filter 212A which can be utilized to identify messages suspected of being associated with phishing activities. Of course, other types of filters associated with other types of undesirable activities can be utilized.

System 200 utilizes phishing filter 212A to filter messages 210 and place the filtered messages into a message list 214. In this message list, responsive to the processing that takes place in the filter 212A, messages can be identified as suspicious and hence presented in a protected environment 216, or the messages can be identified as safe and hence presented in a collection of safe messages 218. The protected environment 216 in this embodiment can be the same or similar to the protected environment in the FIG. 1 example.

In this particular example, phishing filter 212A is depicted as being implemented in connection with one or more applications 208 that reside on the computer-readable media 206 in what can be considered a client system. As such, in at least some embodiments, the described principles and methods can be implemented exclusively on a local client computing device.

Alternatively or additionally, some embodiments can utilize components that are remote from the local client, without departing from the spirit and scope of the claimed subject matter. By way of example and not limitation, one or more message filters, such as message filter 212B, can be remote from the client device and be communicatively linked via one or more networks, such as network 220. In one embodiment, network 220 comprises the Internet.

Exemplary Methods

Figure 3:
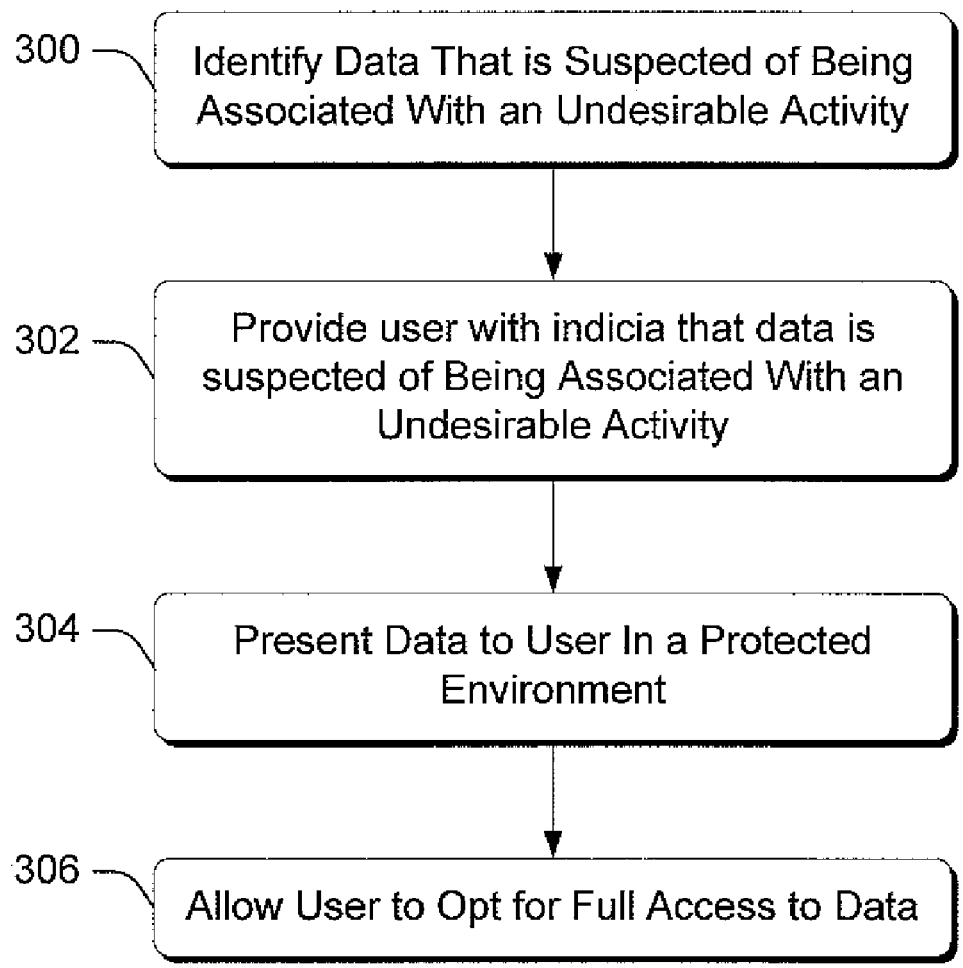
FIG. 3 is a flow diagram that describes steps in a method in accordance with one embodiment.

FIG. 3 is a flow diagram that describes steps in a method in accordance with one embodiment. The method can be implemented in connection with any suitable hardware, software, firmware or combination thereof. In one embodiment, the method can be implemented by software in the form of computer-executable instructions, such as those defining an application that executes on a client computing device. One such application is illustrated at 208 in FIG. 2.

Step 300 identifies data that is suspected of being associated with an undesirable activity. Any suitable data can be utilized. In one embodiment, such data resides in the form of an email message. As noted above, this step can be performed by one or more filters that can be utilized to process the data. As noted above, any suitable message filter can be used. In at least some embodiments, such as the one illustrated in FIG. 2, a message filter that is a phishing filter is utilized to identify data associated with phishing.

Step 302 provides a user with indicia that the data is suspected of being associated with an undesirable activity. This step can be performed in any suitable way. In at least one embodiment, visually distinctive indicia such as a colorful icon or display, as well as a visually distinctive protective layer, can be incorporated as part of a user interface that the user sees. Alternately or additionally, audible alerts and/or event notifications can be provided. For example, a cell phone or PDA user who receives a suspicious email or instant message can be provided with both visual and audible indicia via the user interface, and additionally, a warning message can be sent via email, instant message, or the like. Additionally, a visually impaired person can receive indicia via a screen email reader or other similar device.

Step 304 presents the suspicious data to the user in a protected environment. While this step can also be performed in any suitable way, in at least some embodiments the protective environment is designed to present the data to the user in full fidelity such that the user can view, manipulate and otherwise scrutinize the data, without being allowed to directly interact with the data in a manner that would expose them to the undesirable activity. This enables the user to rely on their knowledge, experience and judgment to ultimately determine whether the data is indeed associated with an undesirable activity. Furthermore, by virtue of the fact that the message is presented in a protected environment, the user is prevented from undertaking any activities with respect to the message that would place the computing environment or user at risk.

By way of example and not limitation, consider a user who is presented, in their inbox, with an email message which is suspected of being associated with a phishing site. Since the message is presented to the user in full fidelity, they are able to scrutinize all parts of the message, including its text, header(s), sender, and even attachments. Accordingly, the user can apply their knowledge, experience and judgment in ultimately making an informed decision as to whether the email message is really dangerous. Also, since the message is presented in a protected environment, the user is prevented from engaging in any risky activities such as clicking a link in the message or opening an attachment.

Step 306 allows the user to opt for full access to the data. For example, the user can choose whether to delete the data or remove the protected environment. The user does not have to make this choice immediately, however. Instead, if the user postpones making this decision, the data remains in the protected environment and available in full fidelity. In this way, the user is warned of the threat and is given an opportunity to scrutinize the data prior to removing the protected environment. In other words, the user is sure to be conscious of the transition of the data from a protected to an unprotected environment. This enhances the user's experience by enabling the user to apply their judgment in deciding how to treat potentially dangerous data.

Figure 4:
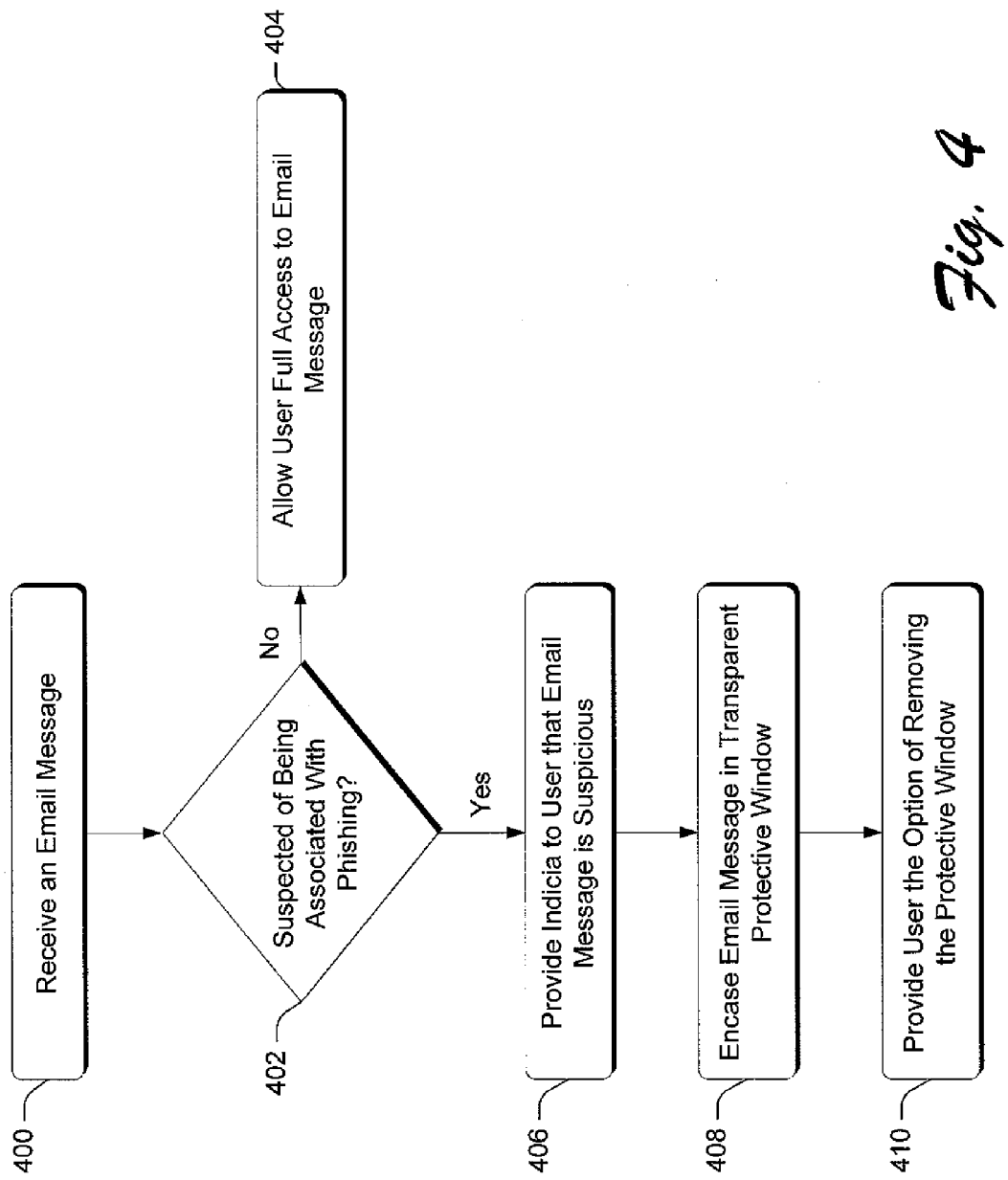
FIG. 4 is a flow diagram that describes steps in a method in accordance with an exemplary embodiment.

FIG. 4 is a flow diagram that describes steps in a method in accordance with an exemplary embodiment. This method can be implemented in connection with an y suitable hardware, software, firmware or combination thereof In one embodiment, the method is implemented in software in the form of computer-executable instructions, such as those defining an application that executes on a client computing device.

Step 400 receives an email message. Any suitable email message can be received. Step 402 determines whether the email message is suspected of being associated with any phishing activities. This step can be accomplished in any suitable way. As noted above, in at least some embodiments, this step is accomplished by utilizing one or more suitable phishing filters that identify suspicious email messages based upon certain appropriate criteria. By way of example and not limitation, these criteria may include: whether some characteristic(s) of the message is similar to a previous suspicious message, whether the message was sent by a source that is a suspected of phishing, or whether a known phishing trick is recognized in the message (e.g. a URL is designated "www.ebay.com@real-phising-site" instead of "www.ebay.com"). Other criteria will be known and appreciated by those skilled in the art.

Additionally, the phishing filter(s) may or may not be located locally on a client computing device. By way of example and not limitation, consider the case in which both a remote and local phishing filter are utilized. In such a case, the remote filter might rely on a continuously updated list of URLs known to be associated with phishing while the local filter might rely on a list of message characteristics deemed suspicious with respect to that particular computing device. In this way, both filters can be utilized in making a determination as to whether an email message is suspicious.

If step 402 determines that the email message is not suspected of being associated with any phishing activities ("no"), step 404 allows a user full access to the email message. Hence, the email message is not presented to the user in a protected environment and the user can engage in any activity otherwise permitted by their email system.

Alternatively, if step 402 determines that the email message is suspected of being associated with any phishing activities ("yes"), step 406 provides indicia to the user that the email message is suspected of being associated with phishing and step 408 encases the email message in a transparent protective window. Either or both of these steps can be performed.

As noted above, this step can be performed in any suitable way. In at least some embodiments, a red shield and a distinctive transparent layer or window are used to provide notice to the user. Distinctive audio and/or other visual warnings, icons, and the like can be included in the protected window. Furthermore, distinctive features such as watermarks, textures, gradients, and lighting effects can be added to the protective window display as well. In at least some embodiments, these distinctive features can be fashioned so as to effectively simulate the tactile aspect of a shrink-wrap coating.

Encasing the email message in the transparent window provides a protected environment in which the user is allowed to access the message in full fidelity but is not allowed to engage in potentially dangerous activities, like directly interacting with the content of the message. For example, in at least some embodiments, the user is prevented from clicking a link in the message, directly entering data in a form or other message component, or opening an attachment associated with the message. As noted above, this allows the user to apply their knowledge, experience and judgment in making an informed decision as to whether the email message was accurately identified as suspicious. For example, a phishing filter may inaccurately identify a safe email message from a sender as suspicious because a URL associated with the email message appears to be associated with phishing. However, the user may subsequently scrutinize the URL and determine that it is in fact associated with a safe site. This effectively provides a robust means for dealing with false-positives.

While this embodiment utilizes a protected environment that includes a distinctive but transparent window, it is to be appreciated and understood that any suitable protective environment can be used to provide protection from any type of data that is suspected of being associated with any undesirable activity, without departing from the spirit and scope of the claimed subject matter.

Finally, step 410 provides the user with the option of removing the protective window thus unblocking the message. As noted above, the user can choose to do this at any time. Furthermore, since the transparent window is distinctively presented so as to provide an indication that the encased email message is deemed suspicious, it is assured that the user has been warned and has consciously decided to remove the protected environment.

Implementation Example

Figure 5:
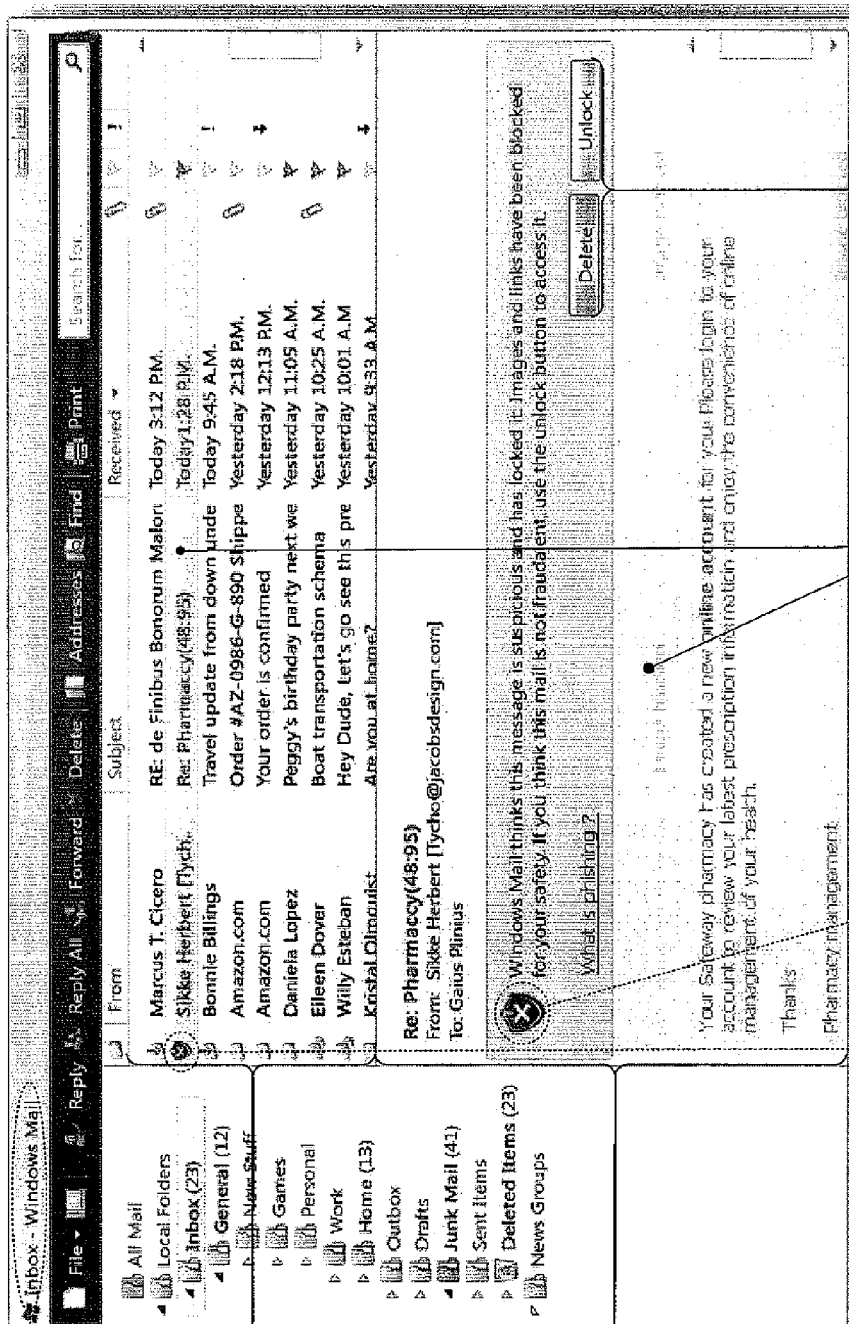
FIG. 5 illustrates an example of a user interface in accordance with one embodiment.

FIG. 5 illustrates an exemplary user interface in which the principles and methods described above can be implemented, generally at 500. While this example illustrates a particular user interface, it should be noted that the principles described in this document can be utilized in connection with any user interface in any application. Furthermore, it is to be appreciated and understood that this constitutes but one example and is not to be used to limit application of the claimed subject matter. Rather, as noted above, the principles described in this document can be employed in other contexts without departing from the spirit and scope of the claimed subject matter.

In this example, user interface 500 includes an email inbox 502 that includes, among other things, an email message list 504 and an email message preview window pane 506. Note that the email message, as provided in message list 504 and preview window pane 506, is presented to the user in a protected environment, characterized by a transparent, visually distinctive window or wrap 508 that encases the email message.

Furthermore, recall that the transparent window or wrap 508 can include distinctive items and features. Here, red shield icon 510A is presented next to the suspicious email message in the message list 504, while red shield icon 510B is included in the preview window pane 506 within a distinctive portion containing warning text and instructions concerning potential courses of action (i.e. clicking "delete", "unblock" or clicking an information link "what is phishing"). Additionally, note that transparent window or wrap 508 can include distinctive features such as watermarks, textures, gradients, and lighting effects so as to simulate the tactile aspect of a shrink-wrap coating.

As discussed above, the user is presented with warning text and instructions regarding potential options from which they can choose. Specifically, options are presented to the user in the form of buttons 512 for deleting the email message ("Delete") or removing the protected environment ("Unblock"). Also, as noted above, the user can simply leave the message in the protected environment perhaps opting to postpone the decision until later. In this regard, note that here, transparent window or wrap 508 presents the user with a link, labeled "what is phishing", which the user can follow to learn more about the threat of phishing.

In summary, FIG. 5 is but one example of a user interface provided by an email application that is configured to receive email messages, process the messages to identify suspicious messages and encase any suspicious messages in a transparent, visually distinctive wrap. This wrap allows the user to read the content of any wrapped messages, but prevents the user from directly interacting with content of any of the wrapped messages until the user specifically chooses to remove the distinctive wrap.

Extensions

As noted above, in at least some embodiments, the described principles and methods can be implemented exclusively on a local client computing device. Alternatively or additionally, some embodiments can comprise components that are remote from the local client - without deviating from the spirit and scope of the claimed subject matter. In this respect, the fact that certain data has been identified as suspicious can be shared with other applications. Furthermore, this data can continue to be presented in a protected environment by the other applications. By way of example and not limitation, consider an email application executing on a client computing device. After the email application identifies an email message as suspicious (e.g. suspected of being associated with phishing), it can notify other applications, such as an internet browser application on the computing device or a phishing site tracking service located remotely from the computing device, that the data is deemed suspicious. Furthermore, some or all of the parts of the email message (message, header(s), attachment(s), etc.) can also be presented in a protected environment by the other applications.

Conclusion

The various principles and methods described above provide protection from undesirable activities, such as phishing, by combining the protection of a message filter with the user's own knowledge and judgment.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
storing, in a memory communicatively coupled to a processor, computer-executable instructions for performing a method of protecting users against undesirable activities;
executing the instructions on the processor;
according to the instructions being executed:
identifying an email message that is suspected of being associated with one or more undesirable activities, the identifying comprising:
receiving input from a remote filter having an updated list of uniform resource locators (URLs) known to be associated with phishing; and
action by a local filter acting on a list of message characteristics deemed suspicious with respect to a device upon which the processor operates;
providing indicia in a user interface that the email message is suspected of being associated with one or more undesirable activities, the user interface comprising a delete button, to delete the email message, and an unlock button, to allow a user full access to the email message, the providing of the indicia being performed by an email application, the email application, upon identifying the email message that is suspected of being associated with one or more undesirable activities, notifies a browser application of the email message and notifies the browser application that the email message is deemed suspicious, the email application and browser application both operated on a computer operated by the user; and presenting the email message in a visually-distinctive protected environment, the protected environment allowing the email message to be scrutinized in full fidelity and prevents user activities with respect to the email message that can expose a user to the one or more undesirable activities, wherein said protected environment comprises a transparent window which encases the email message shown in a message list and preview window pane behind a watermark which contributes to an appearance of a shrink-wrap covering, the appearance of the shrink-wrap covering created by watermarks, textures, gradients and lighting effects to simulate a tactile aspect of the shrink-wrap covering.

2. The computer-implemented method of claim 1, wherein the unlock button operates to remove said protected environment, and wherein such removal will allow the user to click a link or enter information.

3. The computer-implemented method of claim 1, wherein at least one of said one or more undesirable activities is associated with phishing.

4. The computer-implemented method of claim 1, wherein email messages are divided by a filter into those within the visually-distinctive protected environment and those not within the visually-distinctive protected environment.

5. A computer-implemented method comprising:
storing, in a memory communicatively coupled to a processor, computer-executable instructions for performing a method of protecting users against undesirable activities;
executing the instructions on the processor;
according to the instructions being executed:
determining whether an email message is suspected of being associated with one or more undesirable activities, the determining being performed by an email application, the email application, upon identifying the email message that is suspected of being associated with one or more undesirable activities, notifying a browser application of the email message and notifies the browser application that the email message is deemed suspicious, the email application and browser application both operated on a computer operated by a user, and the determining comprising:
receiving input from a remote filter having an updated list of uniform resource locators (URLs) known to be associated with phishing, the updated list adapted for testing for similarity to a suspicious message and testing for receipt from a source suspected of phishing and testing for a number of recipients of the email message; and
action by a local filter acting on a list of message characteristics deemed suspicious with respect to a device upon which the processor operates; and
encasing the email message, if suspected of being associated with one or more undesirable activities, in a transparent protective window that allows the email message to be scrutinized in full fidelity but prevents the user from engaging in activities with respect to the email message that can expose the user to the one or more undesirable activities, wherein a delete button, to delete the email message, and an unlock button, to allow a user full access to the email message, are defined within the transparent protective window, and wherein the transparent protective window encases the email message shown in a message list and preview window pane behind a watermark which contributes to an appearance of a shrink-wrap coating, the appearance of the shrink-wrap coating created by watermarks, textures, gradients and lighting effects to simulate a tactile aspect of the shrink-wrap coating.

6. The computer-implemented method of claim 5, wherein the unlock button operates to provide the user with an option of removing said transparent protective window, and wherein such removal will allow the user to click a link or enter information.

7. The computer-implemented method of claim 5, wherein at least one of said one or more undesirable activities is associated with phishing.

8. The computer-implemented method of claim 5, wherein allowing the email message to be scrutinized in full fidelity comprises permitting a user to view data associated with the email message.

9. The computer-implemented method of claim 5, further comprising providing a notification that said email message is suspected of being associated with one or more undesirable activities.

10. One or more computer-readable media having computer-readable instructions thereon which, when executed by a computer, implement the computer-implemented method of claim 5.

11. A system comprising:
one or more computer-readable media; and
an executable email application that resides on the one or more computer-readable media and which is configured to receive email messages, process the email messages to identify suspicious email messages and provide a user interface that encases any suspicious email messages in a transparent, visually distinctive wrap that can allow a user to read content of any wrapped email messages, but which prevents the user from directly interacting with content of any wrapped email messages until the user specifically chooses to remove the transparent, visually distinctive wrap, the identifying suspicious email messages comprising:
receiving input from a remote filter having an updated list of uniform resource locators (URLs) known to be associated with phishing; and
action by a local filter acting on a list of message characteristics deemed suspicious with respect to a device upon which a processor operates;
the user interface comprising a delete button, to delete a suspicious email message, and an unlock button, to allow the user full access to the suspicious email message; and
the email application, upon identifying the email message that is suspected of being associated with one or more undesirable activities, notifying a browser application within the system of the email message and notifying the browser application that the email message is deemed suspicious, the email application and browser application both operated on a computer operated by the user, wherein the transparent, visually distinctive wrap encases the suspicious email message shown in a message list and preview window pane behind a watermark which contributes to an appearance of a shrink-wrap covering, the appearance of the shrink-wrap covering created by watermarks, textures, gradients and lighting effects to simulate a tactile aspect of the shrink-wrap covering.

12. The system of claim 11, wherein operation of the unlock button removes said transparent, visually distinctive wrap.

13. The system of claim 11, wherein said email application is further configured to provide the user with information about one or more undesirable activities associated with said suspicious email messages.

14. The system of claim 11, wherein said email application is further configured to provide indicia that an email message is identified as a suspicious email message.

15. The system of claim 14, wherein said indicia includes one or more visual features associated with said transparent, visually distinctive wrap.

16. A computing device embodying the system of claim 11.

* * * * *